S. F. DAVENPORT.

Steam-Engine.

No. 6,532. Reissued July 6, 1875.

Witnesses.
S. N. Piper
L. N. Holden

Stephen F. Davenport,
by his attorney.
R. H. Eddy

N. PETERS, PHOTO-LITHOGRAPHER, WASHINGTON, D. C.

UNITED STATES PATENT OFFICE.

STEPHEN FRANKLIN DAVENPORT, OF HALLOWELL, MAINE.

IMPROVEMENT IN STEAM-ENGINES.

Specification forming part of Letters Patent No. 60,861, dated January 1, 1867; reissue No. 6,532, dated July 6, 1875; application filed June 15, 1875.

*To all whom it may concern:*

Be it known that I, STEPHEN FRANKLIN DAVENPORT, of Hallowell, of the county of Kennebec and State of Maine, have invented a new and useful Steam-Engine; and do hereby declare the same to be fully described in the following specification and represented in the accompanying drawings, of which—

Figure 1:
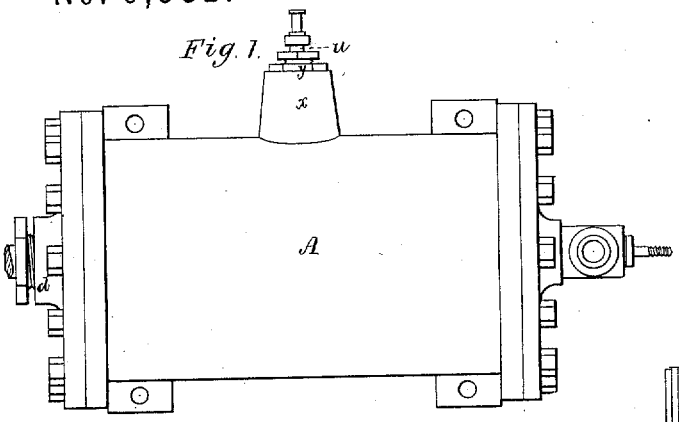
Figure 4:
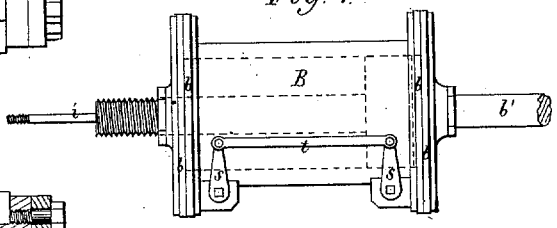
Figure 2:
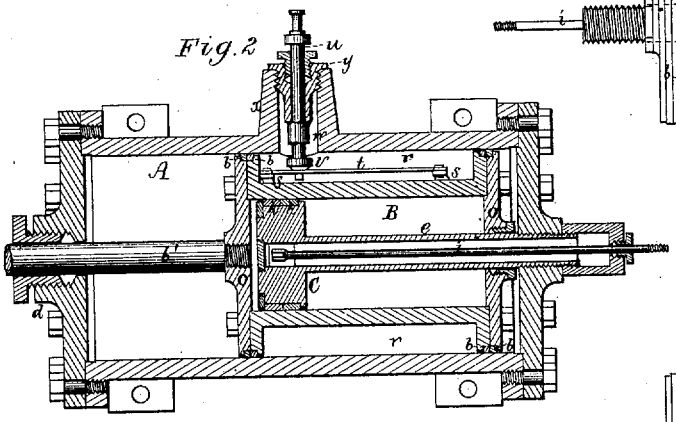
Figure 5:
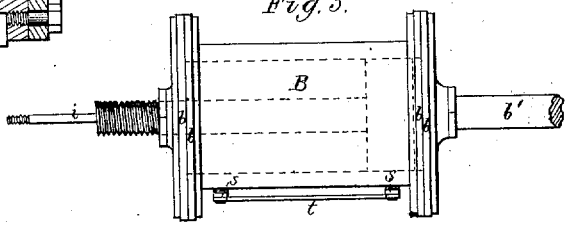
Figure 6:
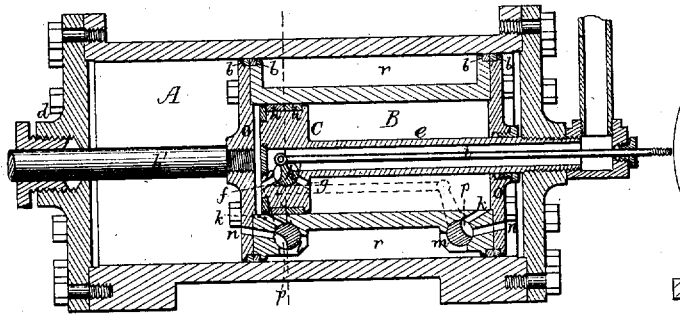
Figure 3:
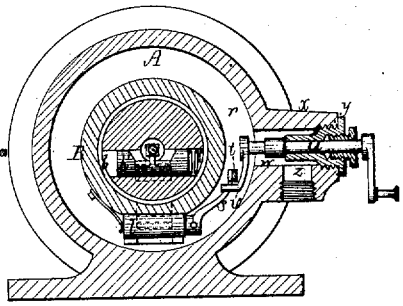

Figure 1 is a top view, Fig. 2 is a horizontal section, and Fig. 3 a transverse section, of the said engine. Fig. 4 is a side view, and Fig. 5 a top view, of its main cylinder-piston, which of itself is a cylinder, and is provided with what I term an auxiliary piston. Fig. 6 is a vertical section of the said engine.

The engine is designed to operate by using the steam expansively in a peculiar manner.

The main cylinder of the engine is shown at A as provided with a piston, whose head B is a hollow cylinder closed at each end. The bearing-flanges of the head B are to be provided with a suitable packing, the drawings representing two steel expansive packing-rings, *b b*, as applied to each flange, and in a groove circumscribing it, each of the said flanges having a diameter equal or about equal to that of the bore of the cylinder A. The piston-rod to the head B is shown at *b'* as going through a stuffing-box, *d*, at one head of the cylinder A. Within the bore of the head B is the auxiliary piston C, which, while the engine is in operation, is to be perfectly stationary, its rod *e* being tubular, and fastened at or near its other end to some standard, or other proper object. The steam for the supply of the engine enters and passes through the rod *e*, which, when the engine is in use, is to be connected with the steam-generator by means of a pipe or a suitable conduit. The head of the auxiliary piston is hollow, and there is a port or opening leading out of each end of it, as shown at *f* and *g*. These ports are provided with a rocker-valve, *h'*, furnished with an operative rod, *i*, to extend through and beyond the piston-rod *e*. The head of the piston C is to fit the bore of the hollow piston-head B, and is to be provided with a suitable packing, such, for instance, as two or more metallic rings, *h h*. There is a port or steam passage, *k*, leading laterally out of the bore of the piston-head B close to each end of such bore, and to one of two rotary valves, *l m*. Another such port or passage, *n*, leads from each of the valves through the next adjacent cap or end plate *o* of the part B. Each of the valves *l m* is made so that when a passage, *p*, of it is in one position it will open communication between its two passages *k* and *n*, and when revolved into another position, the valve will close the passage *k*, and open communication between the passage *n* and the annular space *r* surrounding the head B and between its flanges. The two valves *l m* have arms *s s* extending from them, and connected by rod, *t*, jointed to both arms. A shaft, *u*, carrying a bent arm, *v*, on its inner end is arranged within an exhaust-passage, *w*, leading out of the middle of the cylinder A. The shaft *u* turns in stuffing-box *y* fixed in the projection *x* containing such passage. The steam exhausts laterally out of the passage *w* by a passage, *z*. The purpose of the shaft and its bent arm is to trip each of the valves *l m* at the proper times, which it is to be caused to do by proper mechanism applied to it, and operated by the engine. So to the valve-rod of the auxiliary piston C a proper mechanism for actuating it, or moving it lengthwise back and forth at suitable times, is to be applied.

The engine thus constructed will operate as follows: Steam being admitted through the piston C into the cylinder or head B, and on one side of the head of such piston C, will cause the said head B to be moved in one direction throughout the cylinder A. On the head B having arrived at the terminus of such movement, the valves are to be tripped, so as to open communication between the space which receives such steam and that part of the cylinder A which is next adjacent to that head of the said cylinder toward which the piston-head B had been advanced. At the same time the valve in the piston C is to be tripped so as not only to cut off the entrance of steam into the space which first received it, but to open communication for the steam to operate from the reverse side of the head of the piston C. The head B will next be moved in the opposite direction, and, not only by the action of the second quantity of steam let into it, but by the pressure of the first amount of steam acting expansively. The first quantity of steam, on escaping from the head B into the cylinder A, will expand in both while the head B is in movement, and, by pressing against the outer surface of one end of the said head, will exert a greater amount of pressure therein than it will on the piston C, the excess of pressure operating to aid in moving the head B in the direction the reverse to that in which it was first impelled. During the next movement of the head B the expanded steam will be driven into the annular space about the head B, and from thence will pass out of the exhaust-passage. Thus, during each movement of the head B in the cylinder A, the steam operating to cause such will be assisted by the steam previously employed to effect the necessary movement of the head in the opposite direction, the expanded steam which operated in effecting the latter movement being expelled from the cylinder.

The engine may be made so as to cause the piston-head B to operate, or be moved in one direction by the unexpanded steam, and next moved in the other direction by such steam when allowed to expand, such being what I term a single-acting expansion-engine; but by letting the steam successively on opposite sides of the head of the piston C and into the head B we have a double-acting engine, in which the piston-head B will be driven in either direction by the conjoint action of the unexpanded and the expanded steam.

I do not claim the combination of an expansion-cylinder and separate piston with the main cylinder and piston of an engine, the same being so as to cause the steam, after having moved one piston in one direction, to expand in both cylinders, and by such expansion operate to move the other piston in its cylinder.

What I claim as my invention is—

1. The compound engine, substantially as described, consisting of the cylinder A, the internal movable piston-cylinder B, and the stationary piston C, all arranged as represented, and provided with valves and steam-passages, to operate to cause the cylinder B to be moved within the cylinder A and on the piston C by the steam, essentially as explained.

2. The piston C, provided with the passages *e f g*, and the valve *h'* arranged in it, as described, in combination with the piston-cylinder B, provided with the valves *l m* and the steam-passages *k n* for each of said valves, all as set forth.

STEPHEN FRANKLIN DAVENPORT.

Witnesses:

R. H. EDDY,

J. R. SNOW.